United States Patent
Clare et al.

(10) Patent No.: US 7,239,862 B1
(45) Date of Patent: Jul. 3, 2007

(54) METHOD OF AND SYSTEM FOR PROCESSING PREPAID WIRELESS DATA COMMUNICATIONS

(75) Inventors: Varsha Clare, Pleasanton, CA (US); Brian G. Green, Tracy, CA (US); Deo B. Favorito, San Ramon, CA (US)

(73) Assignee: Cellco Partnership, Bedminster, NJ (US)

( * ) Notice: Subject to any disclaimer, the term of this patent is extended or adjusted under 35 U.S.C. 154(b) by 1090 days.

(21) Appl. No.: 10/247,034

(22) Filed: Sep. 19, 2002

(51) Int. Cl.
*H04M 11/00* (2006.01)

(52) U.S. Cl. ............... 455/406; 455/407; 455/408; 455/409; 455/410; 455/411; 379/114.03; 379/114.07; 379/114.2

(58) Field of Classification Search ............ 455/404, 455/407, 408, 409, 410, 411; 379/114.03, 379/114.07, 114.2
See application file for complete search history.

(56) References Cited

U.S. PATENT DOCUMENTS

| | | | |
|---|---|---|---|
| 5,138,650 A * | 8/1992 | Stahl et al. | ............. 455/408 |
| 5,359,182 A | 10/1994 | Schilling | |
| 5,826,185 A | 10/1998 | Wise et al. | |
| 6,029,062 A | 2/2000 | Hanson | |
| 6,036,090 A | 3/2000 | Rahman et al. | |
| 6,058,300 A | 5/2000 | Hanson | |
| 6,149,353 A | 11/2000 | Nilsson | |
| 6,185,198 B1 | 2/2001 | LaDue | |
| 6,185,414 B1 * | 2/2001 | Brunner et al. | ............. 455/406 |
| 6,226,364 B1 * | 5/2001 | O'Neil | ............. 379/114.2 |
| 6,236,851 B1 | 5/2001 | Fougnies et al. | |
| 6,298,250 B1 | 10/2001 | Nilsson | |
| 6,330,443 B1 | 12/2001 | Kirby | |
| 6,333,976 B2 * | 12/2001 | Lesley | ............. 379/114.01 |

(Continued)

OTHER PUBLICATIONS

Brochure No. SurPay May 2002; "MiLife™ SurePay® Solutions Suite"; Lucent Technologies Bell Labs Innovations; c. 2002; Lucent Technologies; United Kingdom.

(Continued)

*Primary Examiner*—Steve M. D'Agosta
(74) *Attorney, Agent, or Firm*—McDermott Will & Emery LLP (57) ABSTRACT

A prepaid communications system includes a wireless call handling device for receiving wireless calls from wireless customers, a packet data serving node for receiving wireless packet data calls from the wireless call handling device and transmitting the calls to a communications network and an administration system in communication with the packet data serving node. Upon a wireless customer originating a wireless call, the wireless call handling device receives the wireless call and transmits the wireless call to the packet data serving node. The packet data serving node accesses the administration system with identification information input by the customer to obtain a call access authorization for the customer. The administration system transmits the call access authorization to the packet data serving node, the call access authorization including a prepaid volume record indicating an amount of prepaid units available for use by the customer and processing instructions. The packet data serving node then enables the wireless call to proceed on the communications network while monitoring the wireless call and decrementing the available prepaid units from the prepaid volume record associated with the customer. Upon the available prepaid units reaching a predetermined level, as indicated in the processing instructions, the packet data serving node notifies the administration system that the predetermined level has been reached, and the processing instructions are executed.

18 Claims, 4 Drawing Sheets

U.S. PATENT DOCUMENTS

| | | | |
|---|---|---|---|
| 6,430,174 B1 * | 8/2002 | Jennings et al. | 370/352 |
| 6,434,378 B1 | 8/2002 | Fougnies | |
| 6,453,158 B2 | 9/2002 | Donovan et al. | |
| 6,473,610 B1 | 10/2002 | Nilsson | |
| 6,487,401 B2 | 11/2002 | Suryanarayana et al. | |
| 6,496,690 B1 * | 12/2002 | Cobo et al. | 455/408 |
| 6,741,687 B1 | 5/2004 | Coppage | |
| 6,801,781 B1 * | 10/2004 | Provost et al. | 455/466 |
| 6,829,473 B2 | 12/2004 | Raman et al. | |
| 7,127,489 B2 * | 10/2006 | Aho | 709/206 |
| 7,130,612 B1 * | 10/2006 | Blewett et al. | 455/406 |
| 2004/0028055 A1 | 2/2004 | Madour et al. | |

OTHER PUBLICATIONS

U.S. Appl. No. 10/133,232, filed Apr. 26, 2002, Session-Based Accounting.

U.S. Appl. No. 11/138,343, filed May 27, 2005, Determining Chargeable Duration at the Home Agent for a Prepaid MIP Session.

\* cited by examiner

METHOD OF AND SYSTEM FOR PROCESSING PREPAID WIRELESS DATA COMMUNICATIONS

FIELD OF THE INVENTION

This relates generally to a prepaid system for transmitting data over a wireless network and more particularly to an integrated communications system which enables a customer to use a prepaid wireless account in connection with multiple services on networks of different types.

BACKGROUND OF THE INVENTION

Prepaid wireless communications systems, in which a customer or subscriber prepays for usage of a communications system, has become increasingly popular in recent times. In such systems, the customer may purchase blocks of time for making voice telephone calls. For example, a customer can purchase 1000 minutes of air time with which to conduct wireless telephone calls. Upon connecting to the wireless communications system, the customer's account is authorized and authenticated and the call is allowed to proceed. The network monitors the customer's usage time and decrements from the customer's account. If the account becomes depleted, the system can either prompt the customer to purchase more time or the system can terminate the call. Prepaid wireless communications system enable the customer to budget an amount of airtime that will be used during a certain period of time, and to insure that the budget will not be exceeded unless the customer purchases more airtime.

However, current wireless prepay systems are limited to voice calls, in which blocks of time are purchased for use in making wireless voice telephone calls. With the increasing popularity and demand for wireless data transmission systems, including SMS, MMS, BREW and 802.11 systems for wireless LAN, a need for a prepaid wireless data transmission system which offers the same benefits as the prepaid wireless voice transmission systems exists.

SUMMARY OF THE INVENTION

A prepaid wireless data system allows dynamic use of a customer's prepaid balance for any type of service, including voice, SMS, MMS, circuit switched data and packet data, through any type of serving network, including analog/digital voice, SMS, CDPD, circuit switched data, 3G packet data, 802.11 and WAN/LAN. The system analyzes each incoming call, determines whether the call is a prepaid or postpaid call and routes the call to the appropriate network system to process the call. Once the call is directed to the appropriate network system, a network controller communicates with an authentication and authorization server system to obtain authorization for the call and to receive a usage balance available to the customer. The network controller grants access to the network, monitors the call and decrements the customer's balance in real time. If the balance reaches zero, or a predetermined low level, the network controller notifies the authentication and authorization server system and processes the call in accordance with instructions provided in the initial authorization. The authentication and authorization server system can respond either with an updated available balance, which enables the network controller to allow the call to continue, or with instructions to the network controller to terminate the call.

According to one aspect, a method of transmitting packetized data in a prepaid communications network includes:

A. receiving, at a packet data serving node, a packet data call from a wireless network customer;

B. the packet data serving node accessing an administration system with identification information of the customer to obtain a call access authorization for the customer;

C. the administration system transmitting the call access authorization to the packet data serving node, the call access authorization including a prepaid volume record indicating an amount of prepaid units available for use by the customer;

D. the packet data serving node enabling the packet data call to proceed on the communications network;

E. the packet data serving node monitoring the packet data call and decrementing the available prepaid units from the prepaid volume record associated with the customer;

F. upon the available prepaid units reaching a predetermined level, the packet data serving node notifying the administration system that the predetermined level has been reached; and G. the administration system providing processing instructions to the packet data serving node based on pre-programmed directives.

The processing instructions may include actions to be taken by the packet data service node upon the available prepaid units reaching the predetermined level. The actions may include at least one of terminating the packet data call, informing the customer that the predetermined level has been reached and providing the customer with an option to purchase additional prepaid units. The prepaid units may be time-based and/or memory-based. The processing instructions may include providing the customer with an option to purchase additional prepaid units, the method further comprising the steps of processing a purchase request by the customer and updating the prepaid volume record of the customer to reflect the purchase of additional prepaid units by the customer. The method may further includes the step of terminating the packet data call upon the amount of the available prepaid units in the customer's prepaid volume record reaching zero. The packet data call may include a short message service (SMS) call and/or a multimedia message service (MMS) call.

According to another embodiment, a prepaid communications system includes a wireless call handling device for receiving wireless calls from wireless customers, a packet data serving node for receiving wireless packet data calls from the wireless call handling device and transmitting the calls to a communications network and an administration system in communication with the packet data serving node. Upon a wireless customer originating a wireless call, the wireless call handling device receives the wireless call and transmits the wireless call to the packet data serving node. The packet data serving node accesses the administration system with identification information input by the customer to obtain a call access authorization for the customer. The administration system transmits the call access authorization to the packet data serving node, the call access authorization including a prepaid volume record indicating an amount of prepaid units available for use by the customer and processing instructions. The packet data serving node enables the wireless call to proceed on the communications network while monitoring the wireless call and decrementing the available prepaid units from the prepaid volume record associated with the customer. Upon the available prepaid units reaching a predetermined level, as indicated in the processing instructions, the packet data serving node notifies the administration system that the predetermined level has been reached, and the processing instructions are executed.

The processing instructions may include actions to be taken by the packet data serving node upon the available prepaid units reaching a predetermined level. The actions may include at least one of terminating the packet data call, informing the customer that the predetermined level has been reached and providing the customer with an option to purchase additional prepaid units. The prepaid units may be time-based and/or memory-based. The processing instructions may include providing the customer with an option to purchase additional prepaid units, the system further comprising the steps of processing a purchase request by the customer and updating the prepaid volume record of the customer to reflect the purchase of additional prepaid units by the customer. The system may further include the step of terminating the packet data call upon the amount of the available prepaid units in the customer's prepaid volume record reaching zero. The packet data call comprises a short message service (SMS) call and/or a multimedia message service (MMS) call.

According to another embodiment, a prepaid communications system includes a wireless call handling device for receiving wireless calls from wireless customers, a receiving node for receiving wireless calls from the wireless call handling device and transmitting the calls to a communications network and an administration system in communication with the receiving node. Upon a wireless customer originating a wireless call, the wireless call handling device receives the wireless call and transmits the wireless call to the receiving node. The receiving node accesses the administration system with identification information input by the customer to obtain a call access authorization for the customer. The administration system transmits the call access authorization to the receiving node, the call access authorization including a prepaid volume record indicating an amount of prepaid units available for use by the customer and processing instructions. The receiving node enables the wireless call to proceed on the communications network while monitoring the wireless call and decrementing the available prepaid units from the prepaid volume record associated with the customer. Upon the available prepaid units reaching a predetermined level, as indicated in the processing instructions, the receiving node notifies the administration system that the predetermined level has been reached, and the processing instructions are executed.

According to yet another embodiment, a prepaid communications system includes a wireless call handling device for receiving wireless calls from wireless customers, a packet data serving node for receiving wireless packet data calls from the wireless call handling device and transmitting the calls to a communications network and an authorization system in communication with the packet data serving node. Upon a wireless customer originating a wireless call, the wireless call handling device receives the wireless call and transmits the wireless call to the packet data serving node. The packet data serving node accesses the authorization system with identification information input by the customer. The authorization system accesses a prepaid account of the customer based on the identification information, the prepaid account including a prepaid volume record indicating an amount of prepaid units available for use by the customer and processing instructions. The authorization system enabling the wireless call to proceed on the communications network while monitoring the wireless call and decrementing the available prepaid units from the prepaid volume record associated with the customer. Upon the available prepaid units reaching a predetermined level, as indicated in the processing instructions, the packet data serving node notifies the customer that the predetermined level has been reached, and the processing instructions are executed.

BRIEF DESCRIPTION OF THE DRAWINGS

The foregoing and other objects of this system, the various features thereof, as well as the system itself may be more fully understood from the following description when read together with the accompanying drawings in which.

DETAILED DESCRIPTION

Figure 1:
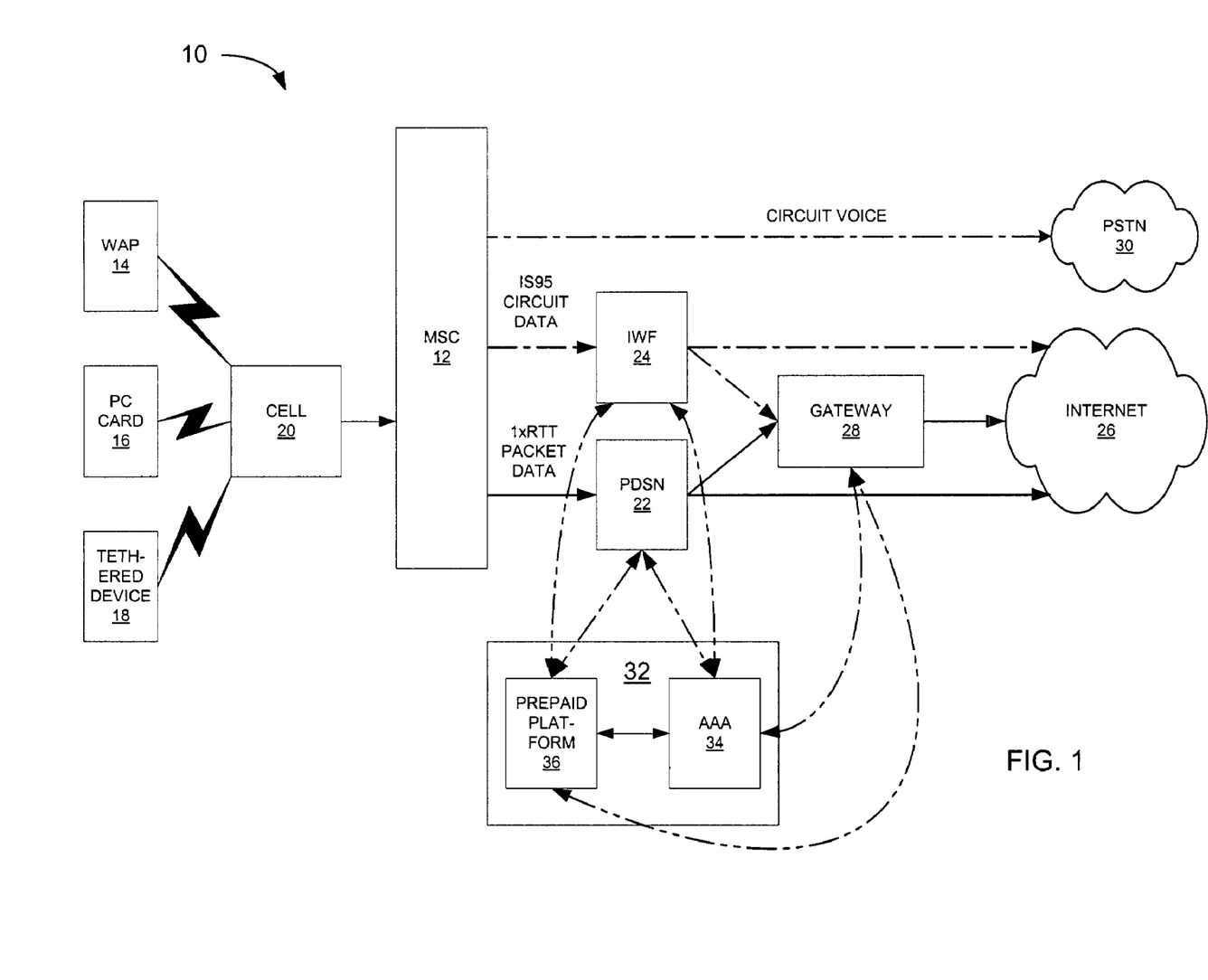
FIG. 1 is a schematic block diagram of the system for enabling universal prepaid communications in accordance with the system.

The present system enables a customer to have access to his or her prepaid account balance regardless of what type of network the customer is in when a communication is initiated. FIG. 1 is a schematic diagram of the communications system 10 in accordance with the present system. System 10 includes a mobile switching center (MSC) 12 which receives wireless calls from a customer via one or more of several wireless transmission devices such as a wireless application protocol (WAP) device 14, a computer having a wireless PC card transmission device 16, such as the Aircard from Sierra Wireless, Inc. of Richmond, British Columbia, and a wireless transmission device 18 which is tethered to a PC. The wireless calls are received by the MSC 12 through one or more of a network of cell stations 20, as is known in the art. System 10 includes a receiving node, such as a packet data serving node (PSDN) 22 for handling packet data calls received from the MSC 12 via a 1xRTT transmission system. An interworking function receiving node (IWF) 24 receives circuit data calls from the MSC 12 via an IS95 transmission system. IWF 24 may include a 2G voice circuit data server, a short messaging server (SMS) and/or a multimedia server (MMS) system which receives calls over an 802.11 transmission system. Both the PSDN 22 and the IWF 24 can direct calls directly to the internet 26 or the calls may be transmitted to the internet 26 through a gateway device 28, such as the OpenWave Services OS WAP gateway, from OpenWave Systems, Inc. of Redwood City, Calif. MSC 12 is also configured to be able to connect circuit voice calls to a public switched telephone network (PSTN) 30. Both the PDSN 22 and the IWF 24 are capable of interacting with an administration system 32 including an authentication, authorization and accounting (AAA) device 34 and a prepaid platform 36, such as Verizon's SurePay system. Usage data records are transmitted between administration system 32 a billing system (not shown), where customer's accounts are maintained.

As described above, the present system is able to process both circuit data prepaid calls and packet data prepaid calls. Circuit data calls are handled through the IWF 24 and packet data calls are handles through the PSDN 22. The type of call received by the MSC 12, as well as the type of network available to the MSC will dictate which system will handle the call. In other words, if a customer is in a geographical location where a 3G (1xRTT) network is not available, the MSC 12 will direct the call to the IWF 24 for processing. On the other hand, if the 3G network is available, the MSC 12 directs the call to the PDSN 22 for processing.

Figure 2A:
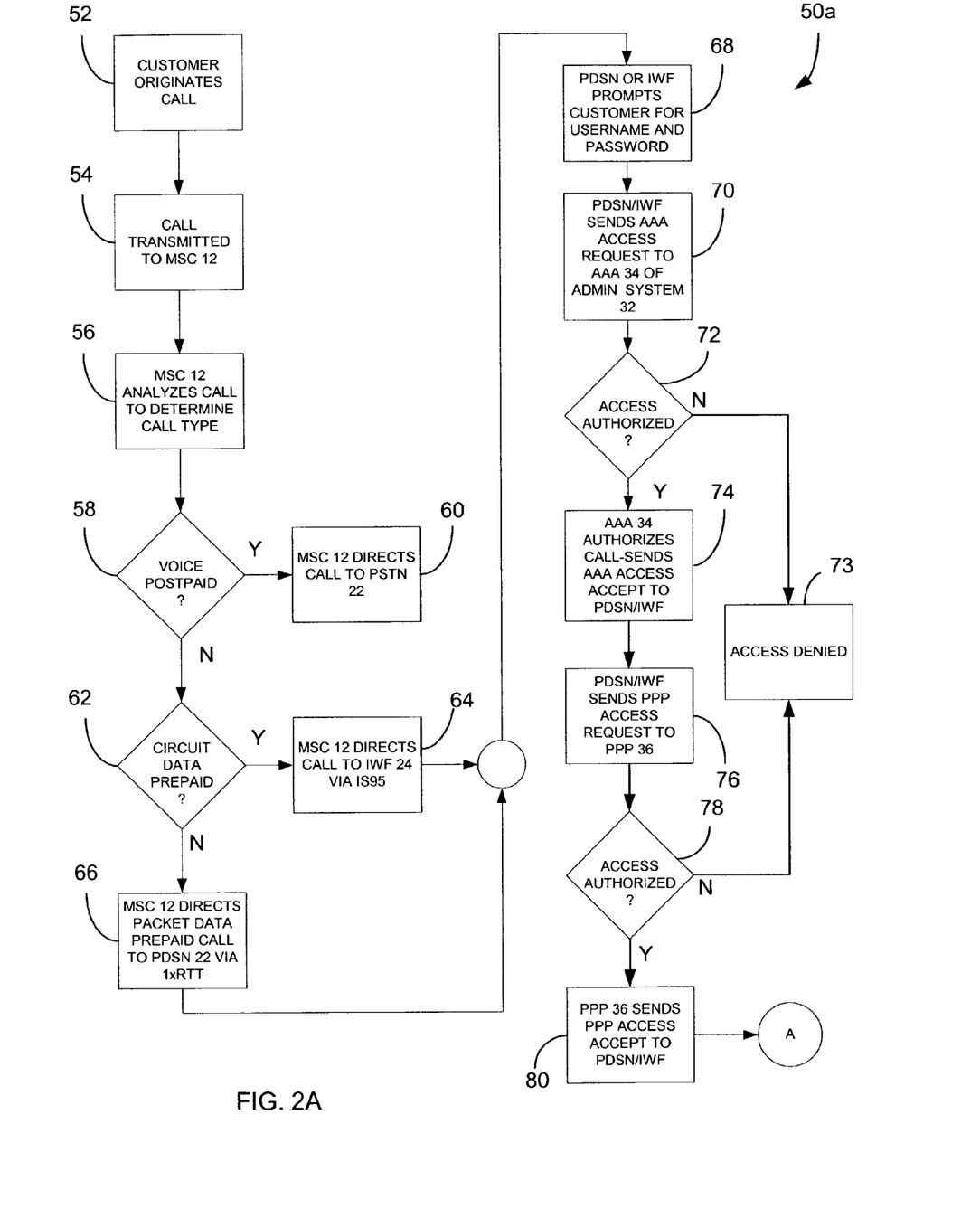
FIGS. 2A and 2B are flow diagrams which show a method of processing prepaid communications in accordance with the system.

The method will now be described with reference to flow diagrams 50a and 50b shown in FIG. 2A and FIG. 2B, respectively. When a customer originates a call, step 52, through either a WAP device 14, PC device 16 or tethered device 18, the call is transmitted to the MSC through a series of cell stations 20, step 54. The MSC 12 then analyzes the call to determine whether the call is a voice postpaid call, a circuit data prepaid call or a packet data prepaid call, step 56, to determine to which transmission system the call will be directed. The MSC 12 determines the call type by analyzing the structure of the data received from the cell stations 20. The details of such analysis of data is known in the art and will not be described. Generally, a prepaid packet data call will consist of packet data and include a flag indicating that it is a prepaid call. If the MSC 12 determines that the call is a postpaid voice call, step 58, the call is directed to the PSTN 30 for processing by that network, step 60. The system 10, after the call is directed to the PSTN 30, is no longer involved in the call.

If the call is determined by the MSC 12 to be a circuit data prepaid call, step 64, the call is directed to the IWF 24 via the IS95 transmission system. If the call is determined by the MSC 12 to be a packet data prepaid call, step 66, the call is directed to the PSDN 22 via the 1xRTT transmission system. If the call is determined by the MSC 12 to be a circuit voice prepaid call, the MSC processes the call in a manner known in the art by communicating directly with the administration system 32. Once the call is received by either the PDSN 22 or the IWF 24, the customer is prompted to enter his or her username and password to gain access to the appropriate network, step 68. After receiving the username and password, the PDSN 22 or IWF 24 sends a AAA access request to the AAA 34 of administration system 32, step 70. The AAA 34 authenticates and authorizes the customer's account if the customer's username and password are valid, step 72. If the username and password are not valid, an access rejection is returned to the PDSN 22/IWF 24 and access to the network is denied, step 73. If the customer's account is determined by the AAA 34 to be prepaid, the AAA 34 sends a AAA access accept message to the PDSN 22/IWF 24, step 74. Alternatively, the AAA 34 may communicate the AAA access accept message directly to the prepaid platform 36. The AAA access accept message may include the IP address of the customer's particular prepaid platform 36, to enable the PDSN 22/IWF 24 to communicate with the prepaid platform 36 directly, if it is not affiliated with the AAA 34. The PDSN 22/IWF 24 then sends a PPP access request to the prepaid platform 36, step 76. Once the PPP access request is received, the prepaid platform 36 verifies the status of the customer's prepaid account, to insure that the customer has a sufficient balance available to pay for the call, step 78. If it is not, access to the network is denied, step 73.

Once the status is determined to be satisfactory, the prepaid platform 36 sends a PPP access accept message to the PDSN 22/IWF 24, step 80. The PPP access accept message includes a balance available for the customer to use. The prepaid balance may be in units of time or in packet or memory units. In one embodiment the balance is the entire balance for which the customer has prepaid. However, in another embodiment, the balance is a portion of the available balance, which may be refreshed, as is described below.

The access accept message includes termination instructions, which inform the PDSN 22/IWF 24 of what actions to take when the prepaid balance reaches zero or a predetermined low level. In one case, the PDSN 22/IWF 24 will simply drop the call. A more user-friendly approach is to warn the customer when the balance reaches a certain amount and instruct the customer to purchase more time or memory units. Alternatively, the system could present the customer with a menu-driven audio application which enables the customer to purchase more time or memory units during the call. The access accept message also includes instructions for the PDSN 22/IWF 24 when the customer's balance reaches the predetermined low level. This feature is preferable when the prepaid platform releases the customer's entire available account balance to the PDSN, rather than blocks. Preferably, these instructions include prompting the customer to purchase more volume before the current balance expires.

Figure 2B:
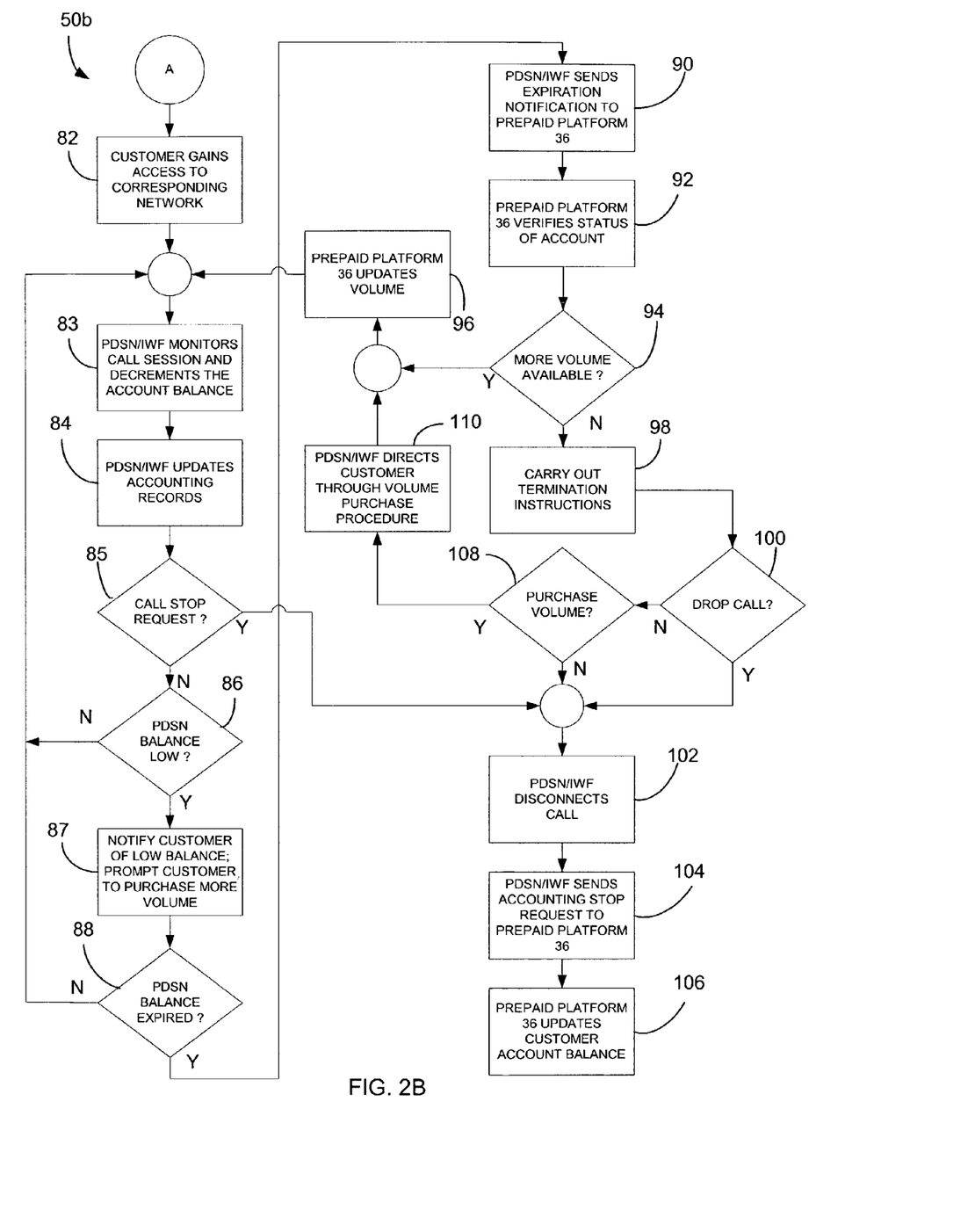

Continuing with FIG. 2B, once the PDSN 22/IWF 24 receives the PPP access accept message from the prepaid platform 36, the customer gains access through the PDSN 22/IWF 24 to the corresponding network, step 82. While the call is being processed through the PDSN 22/IWF 24, the PDSN 22/IWF 24 monitors the call session and decrements the account balance, step 83. The PDSN 22/IWF 24 also updates accounting records for each call, step 84. During the call session, the PDSN 22/IWF 24 continuously monitors the call and the account balance such that, if a call stop request is received from the customer, which is typically a hang up, step 85, the PDSN 22/IWF 24 disconnects the call, step 98. At this point, the PDSN 22/IWF 24 sends an accounting stop request to the prepaid platform, which includes the unused balance, if any, step 100. The prepaid platform is then able to update its user data records, step 102.

If, in step 85, a call stop request is not received, the PDSN 22/IWF 24 continues to monitor the balance to determine if the customer's volume of time or memory has reached the predetermined low level, step 86. If it has not, the system returns to step 83 and continues to monitor the call session and account balance. If, in step 86, the PDSN 22/IWF 24 determines that the balance has reached the predetermined low level, the PDSN 22/IWF 24 directs the customer to the prepaid platform 36 which prompts the customer to purchase more volume. The prompt from the prepaid platform may be in the form of an audible prompt, to which the customer responds by navigating through a keypad menu. It may also be in the form of SMS messages to which the customer may respond via an on-screen menu. After the customer has been prompted to purchase more volume, the PDSN 22/IWF 24 continues to monitor the balance to determine if the customer's volume of time or memory has expired, step 88. If it has not, the system returns to step 83 and continues to monitor the call session and account balance. If, in step 88, through decrementing the customer's balance, the PDSN 22/IWF 24 determines that the balance has reached zero, the PDSN 22/IWF 24 sends an expiration notification to the prepaid platform 36 to inquire into the status of the customer's account, step 90. In step 92, the prepaid platform verifies the status of the customer's account to determine if there is a remaining balance available to the customer. This could occur if the original balance acknowledged by the prepaid platform in step 80 was less than the entire balance available to the customer. If there is a remaining balance available, step 92, the prepaid platform 36 updates the volume of time or memory available and the system returns to step 84 and continues to monitor the call sessions and decrement the account balance.

If, in step 94, the prepaid platform 36 confirms that the customer's volume has expired and therefore, his or her balance is zero, the PDSN 22/IWF 24 carries out the termination instructions provided in the access accept message to determine what action to take, step 98. If the termination instructions dictate that the call should be dropped, step 100, the PDSN 22/IWF 24 disconnects the call, step 102. The PDSN 22/IWF 24 then sends an accounting stop request to the prepaid platform 36, step 104, which informs the prepaid platform 36 that the call has been terminated and provides the amount of any unused balance in the account balance maintained by the PDSN 22/IWF 24. The prepaid platform 36 then updates the customer account balance, step 106.

If, in step 100, the termination instructions do not dictate that the call be dropped, but instead enable the customer to purchase more volume, this option is presented to the customer, step 108. In one embodiment, as described above, the audible menu is presented to the customer, and the options are selected using the keypad associated with the telephone device. Alternatively, a visible menu is presented on the video screen associated with the telephone device, and the customer selects the desired options using the keypad or a touch screen, if the telephone device is so equipped. If the customer does not desire to purchase more volume at step 108, the PDSN 22/IWF 24 disconnects the call, step 102. The PDSN 22/IWF 24 then sends an accounting stop request to the prepaid platform 36, step 104, which informs the prepaid platform 36 that the call has been terminated and provides the amount of any unused balance in the account balance maintained by the PDSN 22/IWF 24. The prepaid platform 36 then updates the data records of the customer, step 106.

If, at step 108, the customer elects to purchase more volume, the PDSN 22/IWF 24 directs the customer through a volume purchase procedure, step 110. The particular structure of the volume purchase procedure may take any form dictated by the particular wireless carrier used by the customer. After the customer purchases additional volume, the prepaid platform 36 updates the volume in the customer's account, step 96. The process then returns to step 83, where the ongoing call session is monitored and the account balance is decremented by the PDSN 22/IWF 24.

In addition to processing of calls by the PDSN 22/IWF 24, gateway 28 may be configured as a local "hotspot" server. For example, the gateway 28 may be an "all-in-one" receiver/server local in, for example, an airport. In such a system, all calls made within a range of the gateway 28 will be handled by the gateway 28 in the same manner as the PDSN 22/IWF 24. When a wireless call is attempted within the range of the gateway 28, the gateway 28 performs the functions of any or all of the cell system 20, the MSC 12 and the PDSN 22/IWF 24. In other words, the gateway 28 receives the call from the customer, determines the type of call and whether it is a prepaid call and monitors the call as it takes place, as described above. In this embodiment, the gateway communicates with the AAA 34 and prepaid platform 36 in the same manner as the PDSN 22/IWF 24.

An example of the operation of the system 10 will now be described with reference to FIGS. 1, 2A and 2B. In this example, a wireless customer has purchased a $50 prepaid package, which provides the customer with 1,000 minutes of use for voice calls and 5 megabytes of data transmission. For the purpose of this example, let us assume that the customer has 18 voice call minutes of use remaining in his or her account.

In step 52, the customer, using a cell phone (WAP) 14, originates a voice call. The transmission is received by one or a series of cell stations 20 and transmitted to the MSC 12, step 54. The MSC analyzes the call to determine what type of call it is, step 56. Assuming the customer is making a packet data voice call, the MSC 12, in step 66, directs the call to the PDSN 22 via the 1xRTT. The PDSN 22 prompts the customer for his or her username and password, step 68, and sends an access request to the AAA 34 of the administration system 32, step 70. The AAA 34 access the customers account to determine if the username and password entered by the customer are correct, step 72. Since the username and password entered by the customer are correct, the AAA 34 sends a AAA access accept message to the PDSN 22, step 74. The PDSN 22, upon receiving the AAA access accept message, sends a PPP access request to the prepaid platform 36, step 76, for the purpose of verifying the customer's prepaid account and to insure that the customer has a sufficient balance available in his or her account to pay for the call. Once the prepaid platform verifies the customer's account, access to the network is authorized, step 78, and the prepaid platform 36 sends a PPP access accept message to the PDSN 22, step 80. The PPP access accept message includes a PDSN balance available for the customer to use. In this example, the customer's account is set up such that blocks of 10 minutes of use (MOU) of the available account balance are included in the PPP access accept message. The customer then gains access to the wireless network associated with the prepaid platform, step 82, and the PDSN 22 monitors the call session and decrements MOUs from the PDSN balance, step 83.

While monitoring and decrementing, the PDSN continuously updates the accounting records associated with the customer's account, step 84, such that, if a call stop request, which is typically when the customer terminates the call, is received, step 85, the customer's PDSN balance is current. Until the PDSN balance reaches the predetermined low level, step 86, the system returns to step 83 and continues to monitor the call session and decrement the PDSN balance. If the PDSN balance does reach the predetermined low level before a call stop request is received, the customer is notified and prompted to purchase more volume, step 87. The volume purchase procedure is described above. Until the PDSN balance expires, step 88, or a call stop request is received, step 85, the system returns to step 83 and continues to monitor the call session and decrement the PDSN balance.

If the customer continues the call for the full 10 minutes originally released such that the PDSN balance does expire, step 88, the PDSN 22 sends an expiration notification to the prepaid platform 36, step 90, indicating that the block of time has expired. The prepaid platform 36 verifies the status of the account, step 92, to determine if further blocks of time are available to be released to the PDSN 22 to enable the system to continue supporting the customer's call. In this case, the customer does have 8 minutes remaining in the account, step 94, so the prepaid platform 36 releases the remaining 8 minutes as a block to the PDSN 22 for use by the customer, step 96. The system then returns to step 83 and continues to monitor the call session and decrement the PDSN balance.

Once the customer uses the remaining 8 minutes such that, in step 94, the prepaid platform confirms that the account balance is zero, the PDSN carries out the termination instructions which were included in the PPP access accept message, step 98. Since our customer's termination instructions have been set up to enable the customer to purchase additional volume, the call is not dropped, step 100, and the customer is prompted to purchase more volume, step 108. Our customer purchases additional volume in the manner described above, step 110, and the prepaid platform 36 updates the customer's account balance and PDSN balance, step 96. The system then returns to step 83 and continues to monitor the call session and decrement the PDSN balance until the call is terminated or the PDSN balance expires.

In the event that the customer's account balance expires and the customer elects not to purchase additional volume, step 108, or the customer terminates the call, step 85, the PDSN 22 disconnects the call, step 102, and sends an accounting stop request to the prepaid platform 36, step 104, which notifies the prepaid platform that the call session has been terminated and updates the account balance maintained by the prepaid platform 36 with any remaining PDSN balance. The prepaid platform them updates the customer's account balance based on this information, step 106.

Figure 3:
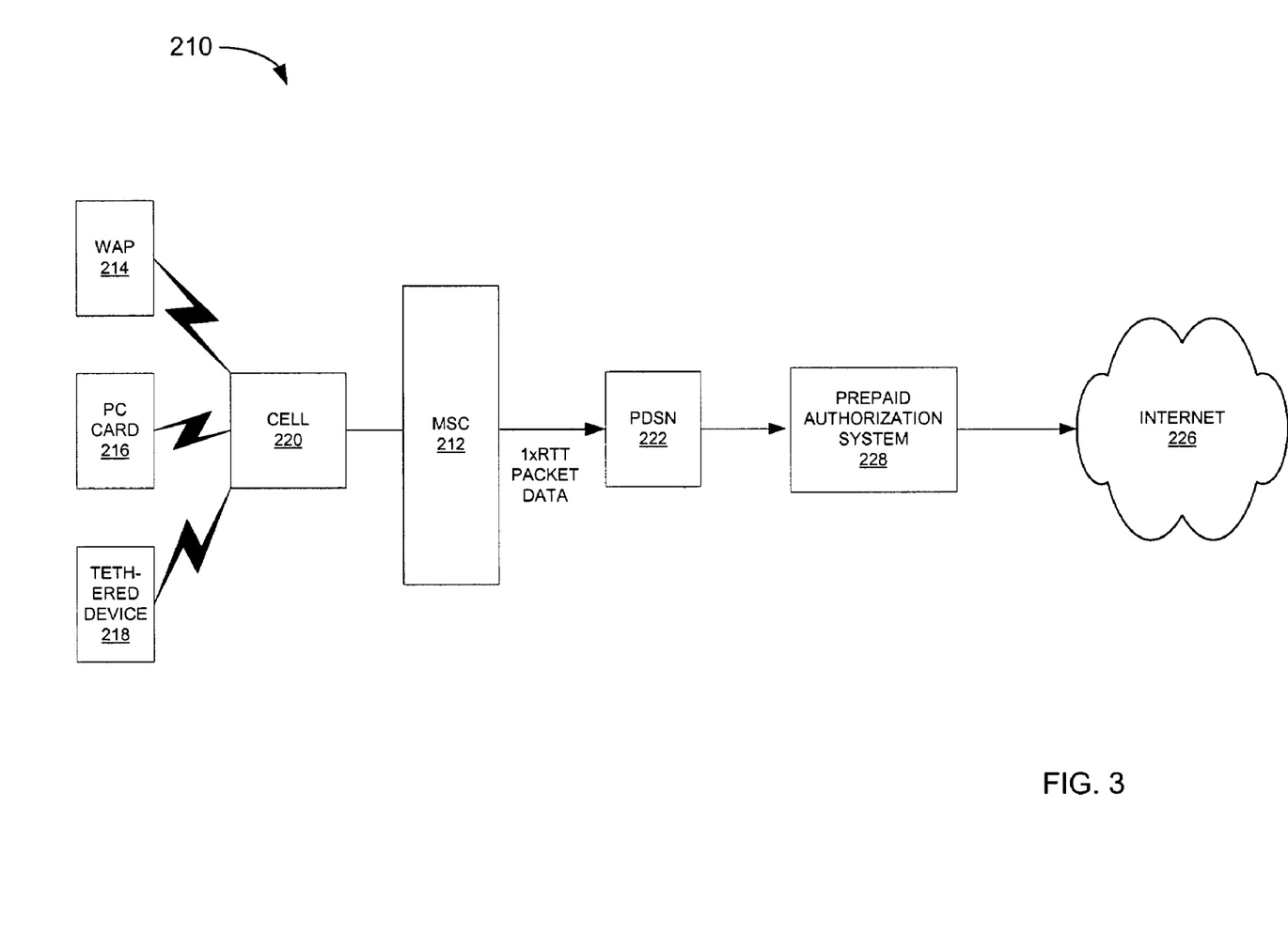
FIG. 3 is a schematic block diagram of another embodiment of a system for enabling universal prepaid communications in accordance with the system.

A second embodiment will now be described with reference to the block diagram of FIG. 3. Prepaid wireless system 210 includes MSC 212, which receives wireless communications from wireless devices 214, 216, and 218 through cell stations 220, as described above. A 1xRTT packet data network connects the call from the MSC 212 and the PDSN 222. System 210 differs from system 10 of FIG. 1 in that it includes a prepaid authorization system 228 which controls communications between the PDSN 222 and the internet 226. In this embodiment, the prepaid authorization system 228 performs the functions performed by the administration system 32 of system 10 of FIG. 1, first authorizing access of the customer to the network based on a username/password protocol and, second, to apply the customer's prepaid balance to the calls made by the customer through the system 210. However, rather than simply providing information to the PDSN 222, which then provides access to the internet based on this information, the prepaid authorization device 228 provides the authorization for the customer, provides access to the network and appropriately manipulates the customer's prepaid balance while the customer's call session is taking place. The system 228 also generates accounting records which are used to update a customer's account upon the termination of a call. This system enables the PDSN 222 to operate solely as a packet data transmission device, since the prepaid authorization device 228 handles all call authorization and account balance inquiry operations.

Accordingly, a communications system is provided which enables customers to prepay for use of the system for the purpose of conducting packet data transmissions. The system is capable of conducting packet data voice calls, as well as SMS and MMS transmissions. All accounting and authorization are handled on a per call basis by an administration system with which the PDSN of the system communicates during the course of the transmission.

The system and method may be embodied in other specific forms without departing from the spirit or essential characteristics thereof. The present embodiments are therefore to be considered in respects as illustrative and not restrictive, the scope of the system and method being indicated by the appended claims rather than by the foregoing description, and all changes which come within the meaning and range of the equivalency of the claims are therefore intended to be embraced therein.

The invention claimed is:

1. A method of managing data communication through a wireless network as a prepaid service, the method comprising steps of:

receiving, at a data communication processing element of the wireless network customer, a call for a data communication for a customer's wireless communication device;

sending identification information of the customer from the data communication processing element to an administration system of the wireless network;

receiving a call access authorization for the customer, from the administration system;

the call access authorization, received from the administration system, including a record for the customer indicating an amount of prepaid units available for use by the customer;

providing data communication for the call for the customer's device through the wireless network, including through the data communication processing element;

monitoring, at the data communication processing element, volume of the data communication for the call for the customer's device through the wireless network;

at the data communication processing element, decrementing available prepaid units from the amount of prepaid units available for use by the customer, based on the monitored volume of the data communication for the call for the customer's device through the wireless network;

upon the decremented available prepaid units reaching a predetermined level, sending a notification to the administration system that the predetermined level has been reached with regard to prepaid units available for use by the customer;

receiving processing instructions from the administration system in the data communication processing element; and further processing the data communication for the call for the customer's device through the wireless network, at the data communication processing element, in accord with the received instructions.

2. The method of claim 1, wherein the data communication processing element comprises an interworking function (IWF) node.

3. The method of claim 1, wherein the data communication processing element comprises a packet gateway device.

4. The method of claim 1, wherein the data communication processing element comprises a packet data serving node (PDSN).

5. The method of claim 4, wherein the further processing of the data communication for the call comprises at least one of terminating the data communication through the wireless network for the call, informing the customer that the predetermined level has been reached, and providing the customer with an option to purchase additional prepaid units.

6. The method of claim 1, wherein:

the further processing of the data communication for the call comprises providing the customer with an option to purchase additional prepaid units, and said method further comprises processing a purchase request by the customer and updating the prepaid volume record of the customer to reflect the purchase of additional prepaid units by the customer.

7. The method of claim 1, wherein:

the predetermined level equals zero available prepaid units; and the further processing of the data communication for the call comprises terminating the data communication through the wireless network for the call, at the data communication processing element.

8. The method of claim 1, wherein the prepaid units are time-based units.

9. The method of claim 1, wherein the prepaid units are packet units.

10. The method of claim 1, wherein the call for data communication for the customer's station comprises a short message service (SMS) call.

11. The method of claim 1, wherein the call for data communication for the customer's station comprises a multimedia message service (MMS) call.

12. The method of claim 1, wherein the step of receiving the call access authorization for the customer, from the administration system, comprises:
receiving an authentication, authorization and accounting (AAA) access accept message from a AAA server;
in response to the AAA access accept message, sending an access request to a prepaid platform; and
receiving an access accept message from the prepaid platform including the amount of prepaid units available for use by the customer.

13. A packet data serving node (PDSN) for managing communication of packetized data through a wireless network as a prepaid service, wherein the PDSN is configured to implement functions comprising:
receiving, at the PDSN, a call for a packet data communication for a customer's wireless communication device;
in response to the received call, sending an access request from the PDSN to a prepaid platform of the wireless network;
receiving a call access authorization for the customer, from the prepaid platform;
the call access authorization, received from the prepaid platform, including a record for the customer indicating an amount of prepaid units available for use by the customer;
providing packetized data communication for the call for the customer's device through the wireless network, via the PDSN;
monitoring volume of the data communication for the call for the customer's device through the wireless network;
decrementing the available prepaid units from the amount of prepaid units available for use by the customer based on the monitored volume of the data communication for the call for the customer's device through the wireless network;
upon the decremented available prepaid units reaching a predetermined level, sending a notification to the prepaid platform that the predetermined level has been reached with regard to prepaid units available for use by the customer;
receiving processing instructions from the prepaid platform; and
further processing the data communication for the call for the customer's device through the wireless network, at the PDSN, in accord with the received instructions.

14. A wireless communication network, comprising:
a cell station for wireless communication with wireless communication devices;
a switch coupled to the cell station for routing wireless calls to and from wireless communication devices, including receiving a wireless data call for a prepaid customer's wireless communication device;
a data communication processing element, for processing wireless data calls between the switch and a data communication network, including the data call for the customer's device; and
a prepaid service authorization system in communication with the data communication processing element;
wherein the data communication processing element and the prepaid service authorization system are configured to process the wireless data call for the customer's device by performing functions comprising:
in response to the data call for the customer's device, sending an access request from the data communication processing element to the prepaid service authorization system;
based on status of a prepaid account of the customer, sending a call access authorization for the customer, from the prepaid service authorization system to the data communication processing element, wherein the call access authorization includes an indication of an amount of prepaid units available for use by the customer;
providing data communication for the call for the customer's device through the wireless network, via the data communication processing element;
the data communication processing element monitoring volume of the data communication for the call for the customer's device through the wireless network;
the data communication processing element decrementing available prepaid units from the amount of prepaid units available for use by the customer, based on the monitored volume of the data communication for the call for the customer's device through the wireless network;
upon the decremented available prepaid units reaching a predetermined level, the data communication processing element sending a notification to the prepaid service authorization system that the predetermined level has been reached with regard to prepaid units available for use by the customer;
the prepaid service authorization system sending processing instructions to the data communication processing element, responsive to the notification that the predetermined level has been reached; and
the data communication processing element further processing the data communication for the call for the customer's device through the wireless network, in accord with the instructions.

15. The network of claim 14, wherein the prepaid service authorization system comprises:
an authentication, authorization and accounting (AAA) device for authenticating the customer or the customer's station; and
a prepaid platform for managing the prepaid account of the customer.

16. The network of claim 14, wherein the data communication processing element comprises an interworking function (IWF) node.

17. The network of claim 14, wherein the data communication processing element comprises a packet gateway device.

18. The network of claim 14, wherein the data communication processing element comprises a packet data serving node (PDSN).

* * * * *